(12) United States Patent
Valencia et al.

(10) Patent No.: US 6,318,905 B1
(45) Date of Patent: Nov. 20, 2001

(54) OPTICAL CONNECTOR ELEMENT HAVING A ONE-PIECE BODY

(75) Inventors: Laurent Valencia, L'Isle d'Abeau; Cyril Causse, Pusignan, both of (FR)

(73) Assignee: Radiall, Rosny-sous-Bois (FR)

( * ) Notice: Subject to any disclaimer, the term of this patent is extended or adjusted under 35 U.S.C. 154(b) by 0 days.

(21) Appl. No.: 09/471,353

(22) Filed: Dec. 23, 1999

(30) Foreign Application Priority Data

Dec. 24, 1998 (FR) .................................................. 98 16451

(51) Int. Cl.[7] .................................................. G02B 6/36
(52) U.S. Cl. .................................. 385/78; 385/81; 385/82; 385/83; 385/84
(58) Field of Search .................................. 385/78, 81, 82, 385/83, 84

(56) References Cited

U.S. PATENT DOCUMENTS 6,010,250 * 1/2000 Sung ........................................ 385/78

FOREIGN PATENT DOCUMENTS

| 0366346 | 5/1990 | (EP) . |
| 0571325 | 4/1993 | (EP) . |
| 0819960 | 1/1998 | (EP) . |
| 9535520 | 12/1995 | (WO) . |

* cited by examiner

Primary Examiner—Mohammad Sikder
(74) Attorney, Agent, or Firm—Schweitzer Cornman Gross & Bondell LLP

(57) ABSTRACT

An optical connector element having a coupling face for coupling to another optical connector element. It comprises: a ferrule; a ferrule holder co-operating with the ferrule to form a continuous ferrule assembly; a body receiving said ferrule assembly and open on the coupling face end so as to enable said ferrule assembly to be inserted into it; resilient means tending to urge the ferrule assembly inserted into the body so that it is pushed back out of said body; means for preventing the ferrule assembly from rotating relative to the body; and snap-fastening shapes on the ferrule assembly and on the body. The snap-fastening shapes on the body are situated on that side of the resilient means which is closer to the coupling face, and they are mounted on the body in a manner such that they can retract reversibly.

11 Claims, 10 Drawing Sheets

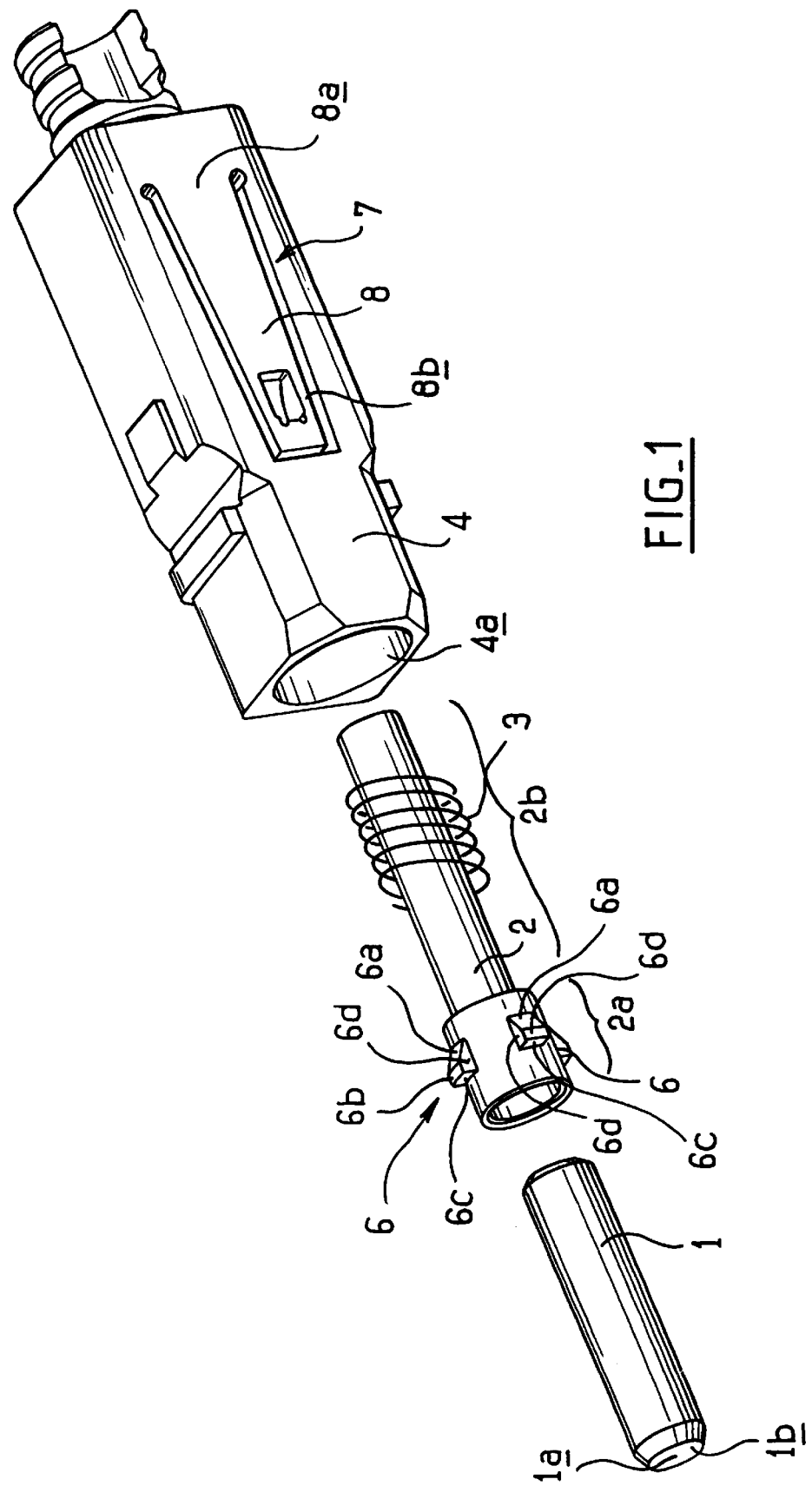
FIG_1

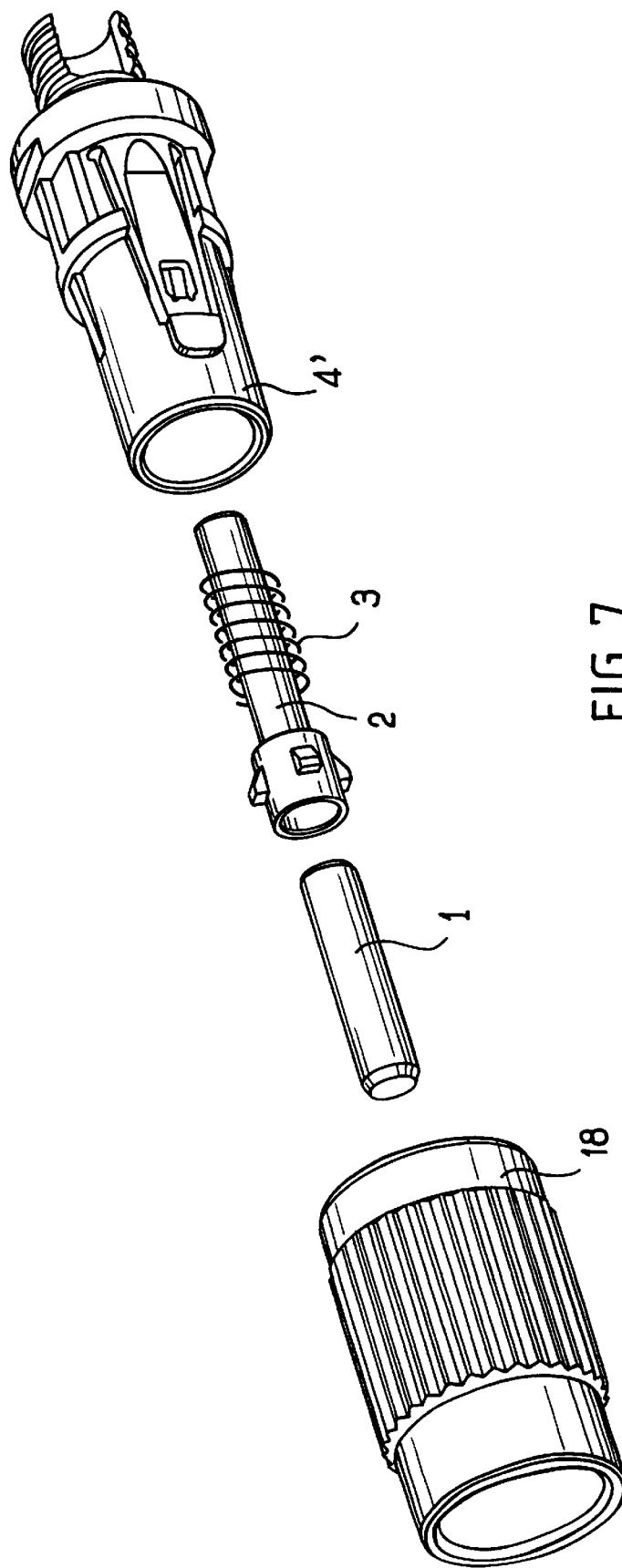

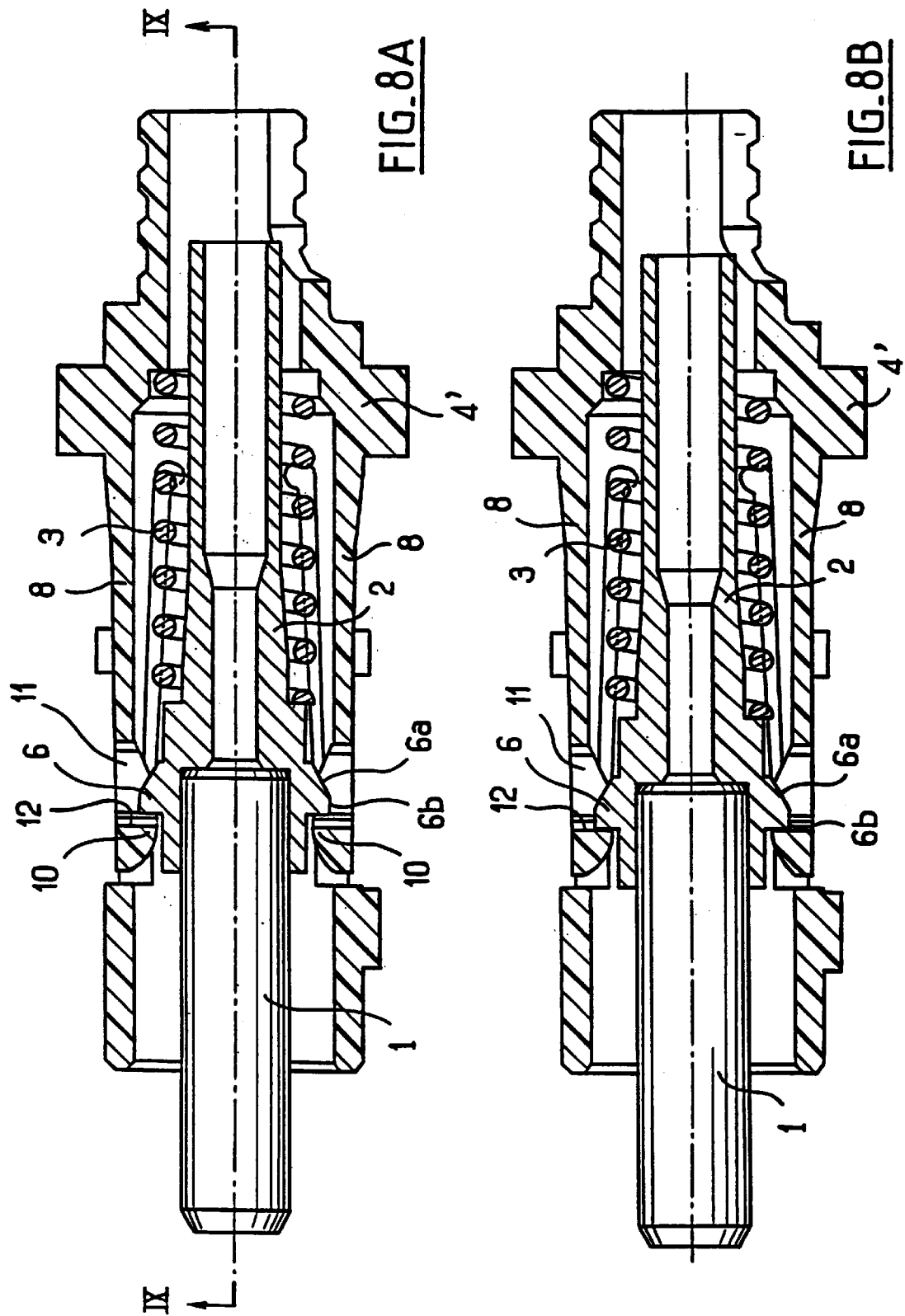

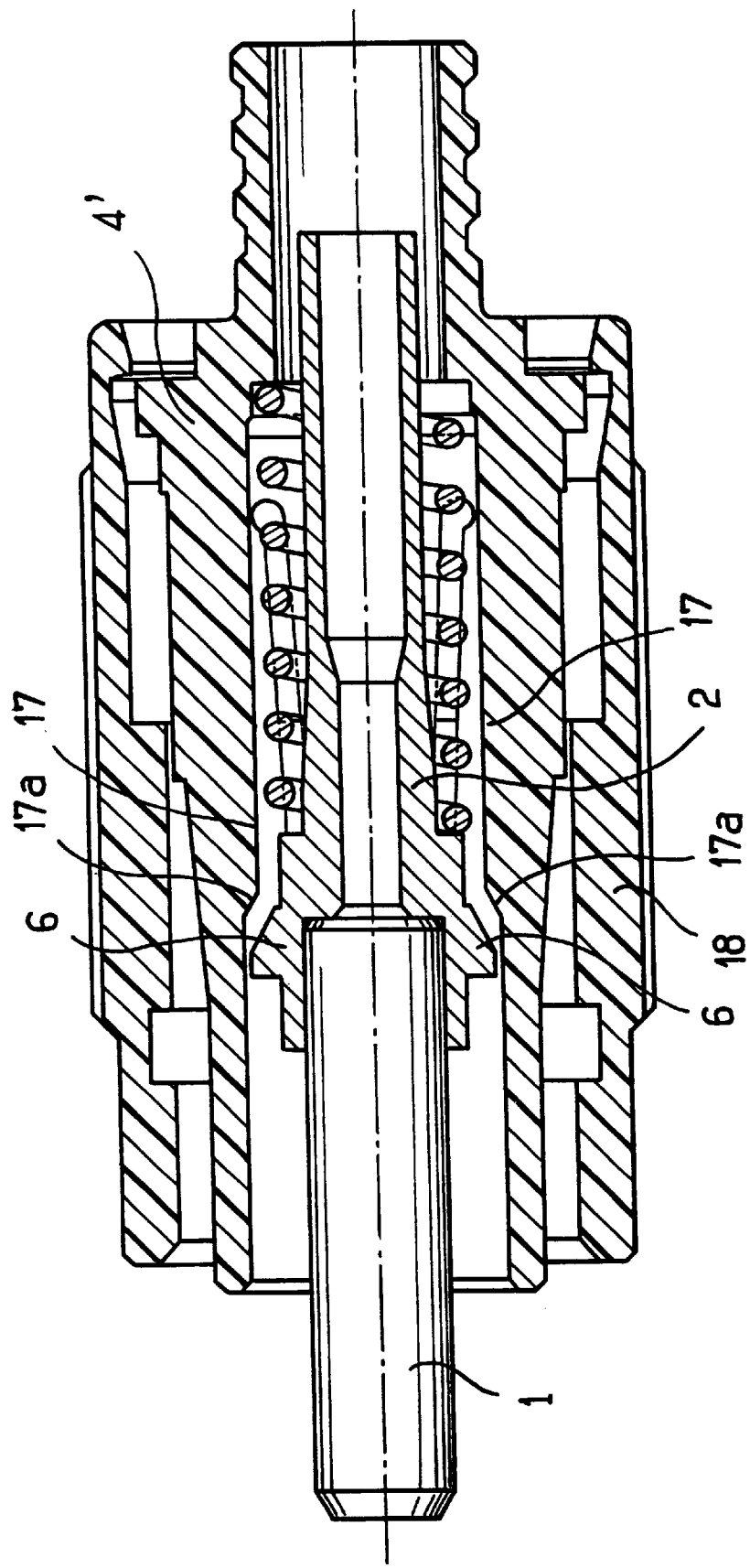

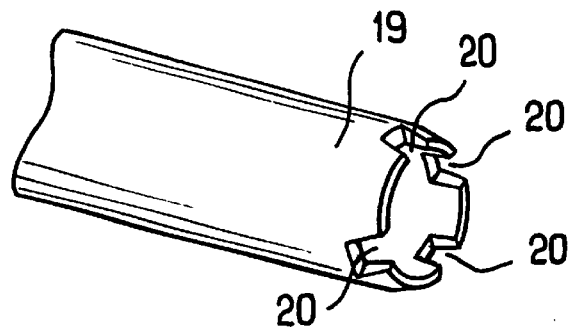
FIG_12
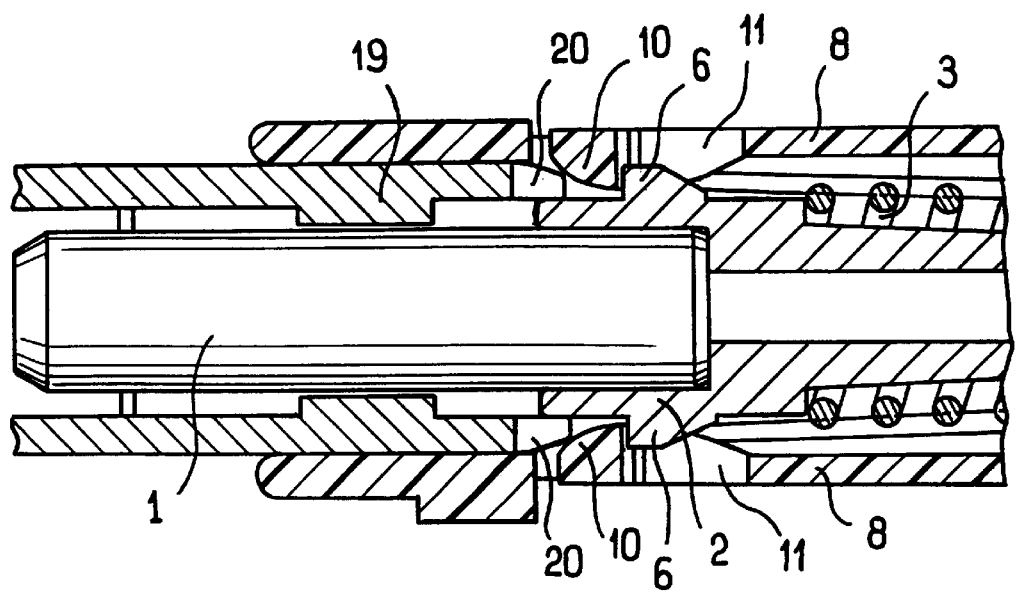
FIG_13
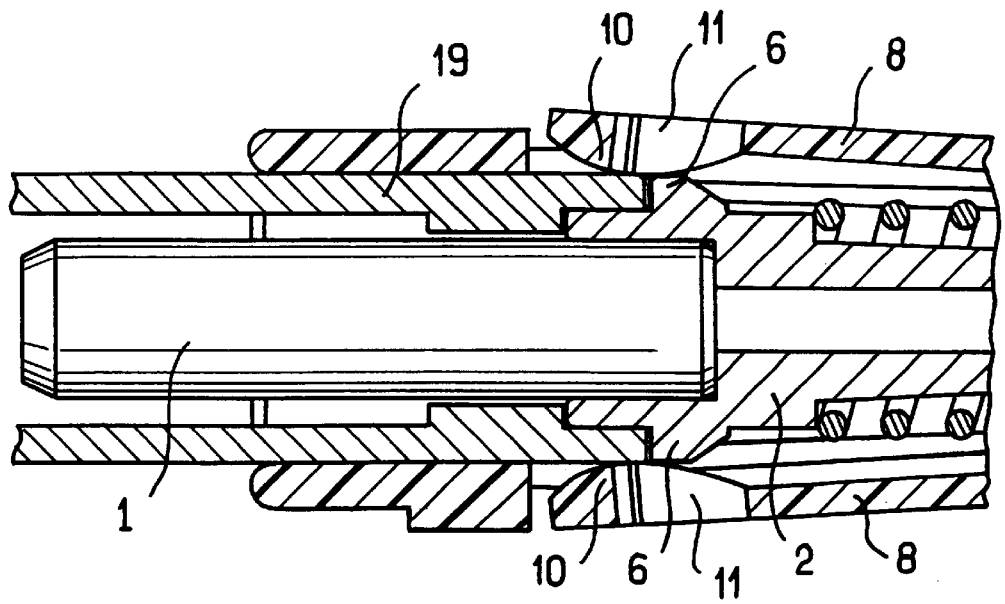
FIG_14

OPTICAL CONNECTOR ELEMENT HAVING A ONE-PIECE BODY

BACKGROUND OF THE INVENTION

The present invention relates to an optical connector element having a one-piece body.

It is known that an optical fiber includes a core which is the portion in which a light beam to be transmitted propagates, and that the core has a centering tolerance of about 0.8 μm (for single mode fibers) within the section of the fiber.

It is also known that an optical fiber is mounted in a connector element by being fixed in a sheath referred to as a "ferrule", in which sheath the fiber is generally glued and then polished at its end, and that such mounting induces a centering tolerance of about 2 μm.

As a result, the position of the core of an optical fiber relative to its ferrule is subjected to a cumulative tolerance value which, when two fibers are to be connected together poses a problem because there is a high likelihood that the facing cores of the two fibers will not coincide.

To reduce this risk of non-coincidence, it is known that it is possible to perform a standardized angular positioning operation in the following manner, once the fiber has been set in resin in its ferrule, and its end has been polished.

The fiber held in the ferrule is presented to the end of a fiber mounted in an orientation plug. In the plug, the fiber has standardized eccentricity, i.e. its core is offset relative to the geometrical center of the outside section of the ferrule of the plug by a given distance in a given direction.

The ferrule is presented in a plurality of different angular positions facing the orientation plug. In general, four or six such positions are used which are angularly spaced apart by 90° or by 60°.

A light signal is transmitted between the fiber to be oriented and the fiber in the orientation plug, and the angular position in which the signal is transmitted best is chosen as being the optimum orientation.

The ferrule is then held stationary in a connector element in an angular position in which the fiber lies in its optimum orientation, by means for preventing it from rotating, which means are provided in the connector element.

Thus, when the fiber oriented in this way is connected to another fiber oriented under the same conditions, the cores of both of the facing fibers lie within the same angular sector.

It is also known that, in order for two coupled-together connector elements to guarantee good optical connection between two fibers, it is essential for the end faces of the two fibers to be held facing each other independently of the mechanical stresses to which the coupled-together connector elements might b subjected, which stresses can, in particular, result from handling one or more optical cables.

For that purpose, an alignment sleeve is used for the ferrules, and the inside of each connector element is organized to allow clearance between firstly the fiber and its ferrule and secondly the remainder of the connector element, so that the two ferrules held facing each other by the alignment sleeve inside the two coupled-together connector elements form an assembly which is capable of floating inside the coupled-together bodies of the two connector elements.

One difficulty with the optical connector elements lies in the need to hold the ferrules angularly while also allowing them to float inside each connector element.

OBJECTS AND SUMMARY OF THE INVENTION

An object of the invention is to provide a connector element that overcomes that difficulty, i.e. a connector element that leaves sufficient clearance for the ferrule but that enables the fiber to be oriented after it has been set in resin and polished.

The present invention provides an optical connector element having a coupling face for coupling to another optical connector element and comprising:

a) a ferrule serving to receive the end portion of an optical fiber;

b) a ferrule holder co-operating with the ferrule to form a continuous ferrule assembly;

c) a body receiving said ferrule assembly and open on the coupling face end so as to enable said ferrule assembly to be inserted into it;

d) resilient means tending to urge the ferrule assembly inserted into the body so that it is pushed back out of said body towards the coupling face of the connector element;

e) means for preventing the ferrule assembly from rotating relative to the body;

f) snap-fastening shapes on the ferrule assembly; and g) snap-fastening shapes on the body;

wherein the snap-fastening shapes on the body are situated on that side of the resilient means which is closer to the coupling face, and they are mounted on the body in a manner such that they can retract reversibly.

In the context of the present invention, the term "coupling face" of a connector element is used to mean its face via which it is connected to another connector element.

In a particular embodiment of the invention, the snap-fastening shapes on the body are supported by elastically-deformable portions of the body.

In a preferred variant of the embodiment, the elastically-deformable portions of the body that support the snap-fastening shapes are constituted by the free ends of resilient beams cut out longitudinally in the thickness of the wall of the body.

An explanation follows of how the connector element of the invention makes it possible to overcome the difficulty resulting from the need to hold the ferrule angularly while also allowing it to float in the connector element.

It can be understood that, in the event of mechanical stress, the coupled-together connector elements can be displaced slightly relative to each other, which can give rise to the ferrules being tilted slightly relative to their respective bodies, and that such tilting leads to radial movement which is large remote from the end faces of the two ferrules but which is quite small in the vicinity of said end faces.

In the invention, the snap-fastening shapes are positioned on the coupling face end of the resilient means, which makes it possible to position them as close as possible to the facing end faces of the two fibers, and a relatively small amount of radial clearance between the snap-fastening shapes suffices to impart considerable freedom of movement to the ferrule assembly in the body of the connector element, while maintaining its angular indexing.

In addition, the fact that the snap-fastening shapes are situated on the front of the resilient means, i.e. on that side of the resilient means that is closer to the coupling face, facilitates access to said snap-fastening shapes, and in particular to those on the body that can retract, which makes it possible to release them so as to orient the fiber while testing various angular positions for the ferrule assembly in the body.

In order to reduce the number of parts making up the connector element of the invention, in a particular embodiment of the invention, the snap-fastening shapes on the body and on the ferrule assembly constitute an axial abutment which limits the axial displacement of the ferrule assembly in the body towards the coupling face of the connector element.

In this embodiment, the fact that the snap-fastening shapes provided on the body can be retracted makes it possible to mount the assembly made up of the ferrule and of its ferrule holder in the one-piece body of the connector element merely by engaging said assembly into the body, via its opening which is situated in the coupling face end of the body.

BRIEF DESCRIPTION OF THE DRAWINGS

In order to enable the invention to be better understood, embodiments given by way of non-limiting example are described below with reference to the accompanying drawings, in which:

FIG. 1 is an exploded perspective view of a first embodiment of an optical connector element of the invention;

FIG. 7 is an exploded perspective view of an optical connector element in a second embodiment of the invention;

FIG. 8A is an axial section view of the connector element of FIG. 7, in the partially assembled state;

FIG. 8B is a view analogous to FIG. 8A;

FIG. 9 is a section view on IX—IX of FIG. 8A, after the coupling ring has been installed;

FIG. 12 is a perspective view of the front of an orientation tool;

FIG. 13 is an axial section view showing the orientation tool while it is being inserted into the connector element so as to act on the snap-fastening shapes in order to retract them;

FIG. 14 is a view analogous to FIG. 13, showing the tool acting on the snap-fastening shapes.

MORE DETAILED DESCRIPTION

The connector element shown in FIG. 1 comprises a ferrule 1, a ferrule holder 2, a helical spring 3, and a body 4.

The ferrule 1 is a sheath provided with an axial channel 1*a* passing through it from end to end, which channel serves to hold the end portion of an optical fiber (not shown) whose end face is flush with the contact face 1*b* of the ferrule.

Figures 2A, 2B:
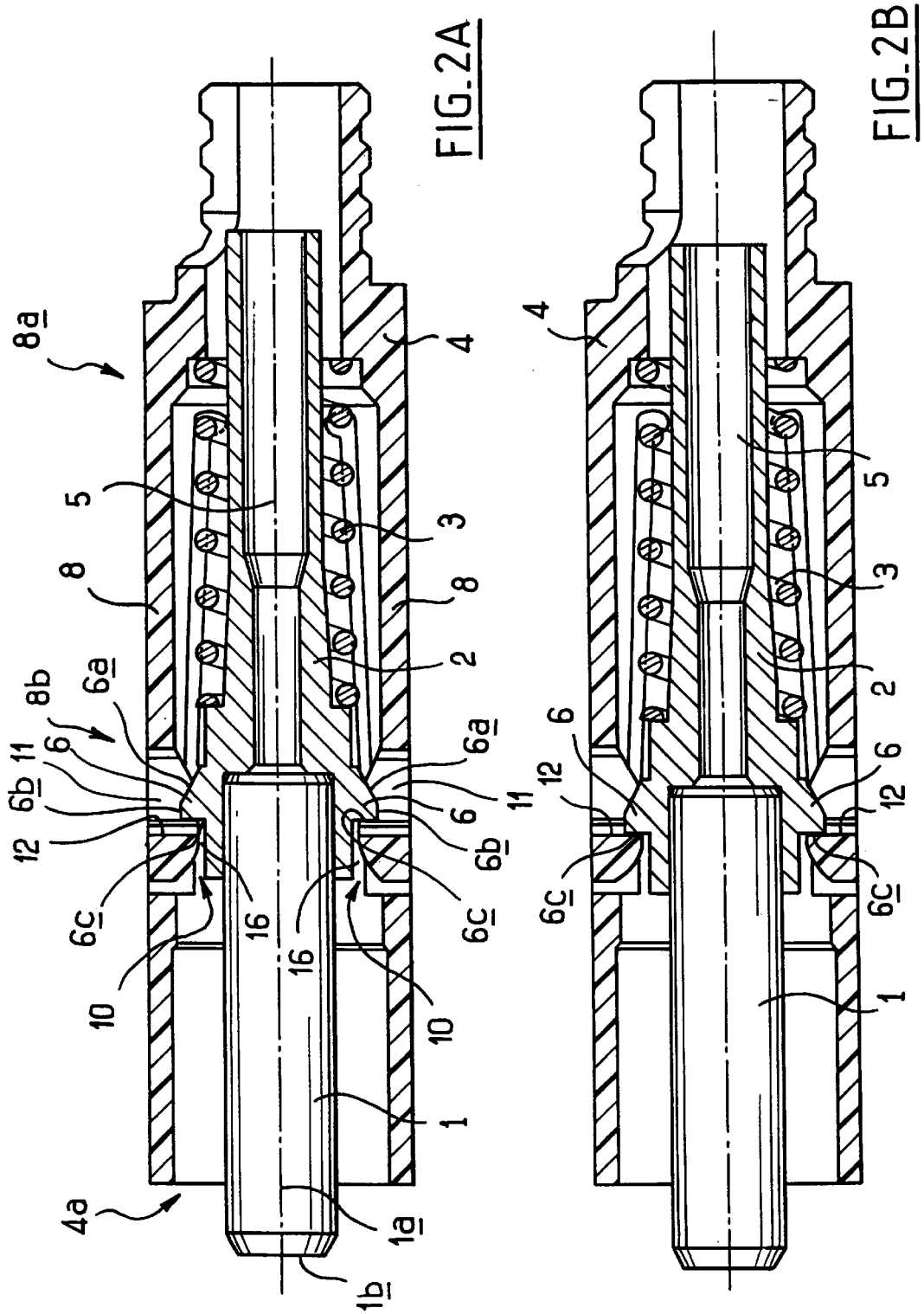
FIG. 2A is an axial section view of the connector element of FIG. 1, shown in the assembled state.
FIG. 2B is a view analogous to FIG. 2A.
Figure 3:
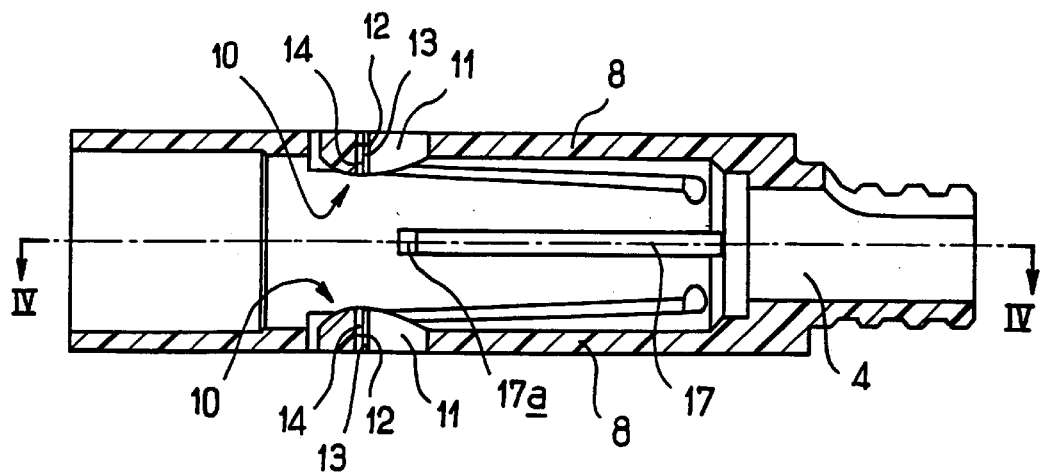
FIG. 3 is an axial section view analogous to FIG. 2A, showing the body on its own.

The ferrule holder 2 is a part made of metal and it comprises a front portion 2*a* serving to receive the ferrule as fitted into a recess provided for this purpose, and a rear portion 2*b* serving to receive a portion of the covered optical fiber (not shown) engaged in the ferrule holder and glued in its axial channel 5 (FIGS. 2A, 2B).

The front portion 2*a* of the ferrule holder is provided with four lugs 6 uniformly distributed around the ferrule holder with the spacing between any two adjacent lugs being one fourth of one turn.

Each lug 6 comprises a frustoconical rear portion and a cylindrical front portion, the common axis of the cylinder and of the cone within which said lugs lie being the same as the axis of the ferrule holder.

Going from rear to front, each lug 6 thus has a ramp 6*a*, a side face 6*b*, and an end face 6*c*, as well as two radial faces 6*d* that extend over the entire length of the lug.

The body 4 is that of an SC-type connector element. It is made in one piece, and it is provided with an opening 4*a* at the coupling face end of the connector element (on the left in FIG. 2).

The details of the outside shape of the body are not described herein.

It should be noted that the body is provided with two resilient beams 8 cut out in its opposite side walls 7, secured to the body via their rear ends 8*a*, and free at their front ends 8*b*.

Each of the beams 8 can be deformed radially in elastic manner.

Figure 6A:
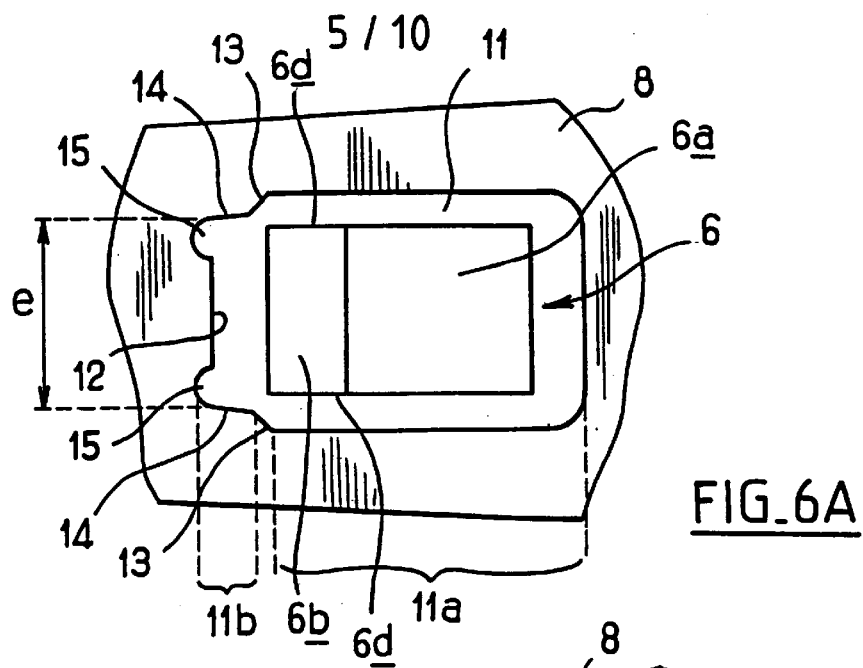
FIG. 6A is a view on a larger scale of the detail VI of FIG. 5.
Figure 6B:
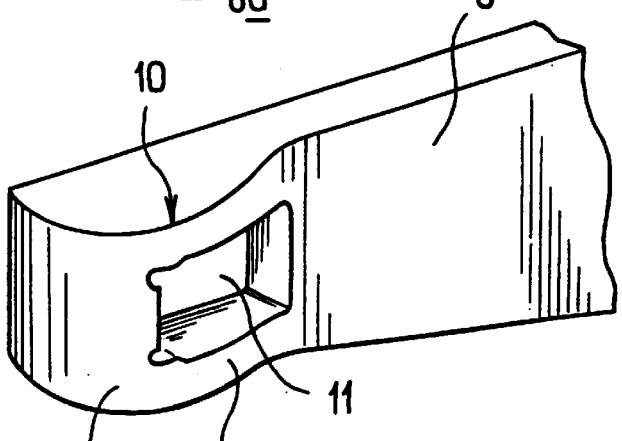
FIG. 6B is a perspective view from the inside of the end of a beam.

At its free end 8*b* which is more clearly visible in FIGS. 6A and 6B, the beam is provided with a snap-fastening shape which serves to co-operate with one of the lugs 6 on the ferrule holder.

Figure 4:
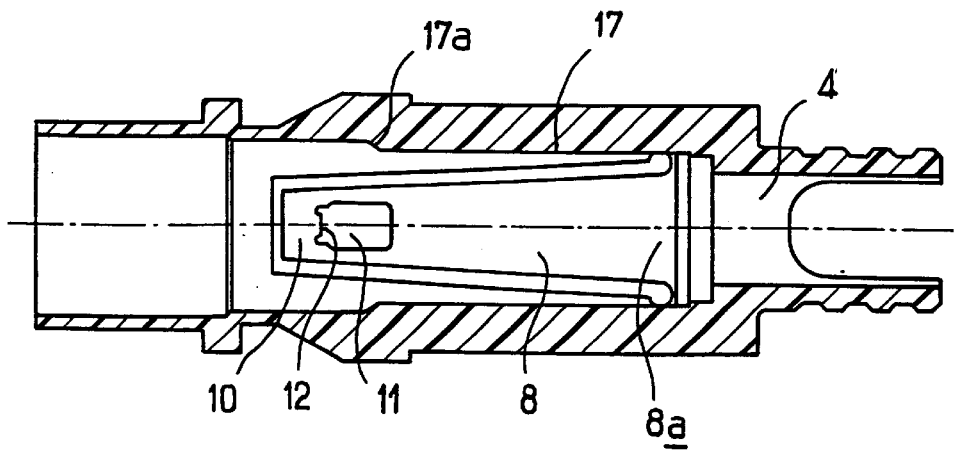
FIG. 4 is a section view on IV—IV of FIG. 3.

This snap-fastening shape comprises a projection 10 on the side wall 7 inside the body, which projection is provided with a through radial opening 11 whose section can be seen more clearly in FIGS. 4 and 6A.

At the front end of the beam 8, i.e. at the coupling face end, the projection 10 (which can be seen well in FIG. 6A) forms a rounded bearing surface that acts as a cam, as described below with reference to FIGS. 12 to 14, by causing the beam 8 to deform elastically outwards when a part is displaced axially inside the body and bears against the front of the beam.

In other words, the snap-fastening shape of the body comprises a front cam constituted by the rounded bearing surface formed by the projection 10, which causes it to retract when a part bearing against said front cam is inserted axially into the body.

The radial opening 11 is, in particular, defined by an abutment surface 12 which, as shown in FIG. 2, serves as an abutment for the end face 6*c* of the lug.

The section of the opening 11 comprises a rear portion 11*a* that is substantially rectangular and whose width is greater than that of each lug 6, and a front portion 11*b* that is narrower and that is connected to the rear portion via two convergent walls 13.

The front portion 11*b* comprises a portion defined by two other convergent walls 14 that are separated at their ends that are closer together by a distance substantially equal to the width of each lug.

Each convergent wall 14 is extended by a setback 15 which leads to the above-defined abutment face 12.

As can be easily understood from the view in FIG. 2A, engaging the ferrule holder 2 into the body 4 via the opening 4A firstly causes the ramps 6a of two opposite lugs to be put in contact with the projections 10 of the two opposite resilient beams of the body.

By sliding over the projections, the ramps 6a push the front ends 8b of the beams 8 outwards, and enable the lugs to go beyond the abutment faces 12 of the openings 11 in the projections, as shown in FIG. 2A.

The ferrule holder 2 is thus snap-fastened in the body 4.

At this stage of the insertion of the ferrule holder into the body, which corresponds to FIG. 2A, the helical spring 3, whose function is to push the ferrule holder and the ferrule back towards the coupling face of the body, is compressed between the ferrule holder and the body by the insertion force, but each lug 6 is held captive in the opening 11 of the corresponding projection, in the rear portion 11a of said opening, i.e. with some angular clearance resulting from the difference in width existing between the lug and the rear portion of the opening.

On releasing the ferrule, and therefore on ceasing to exert a force thereon towards the rear of the connector element, the ferrule holder is pushed back by the helical spring 3 towards the coupling face, as visible in FIG. 2B.

The radial faces 6d of each snap-fastened lug are then guided by the convergent walls 13 towards the front portion 11b of the opening.

The end face 6c of each lug comes into abutment against the abutment face 12 of the opening 11 by being lightly wedged between the convergent faces 14, and the ferrule holder is thus angularly positioned very accurately in the body.

Figure 5:
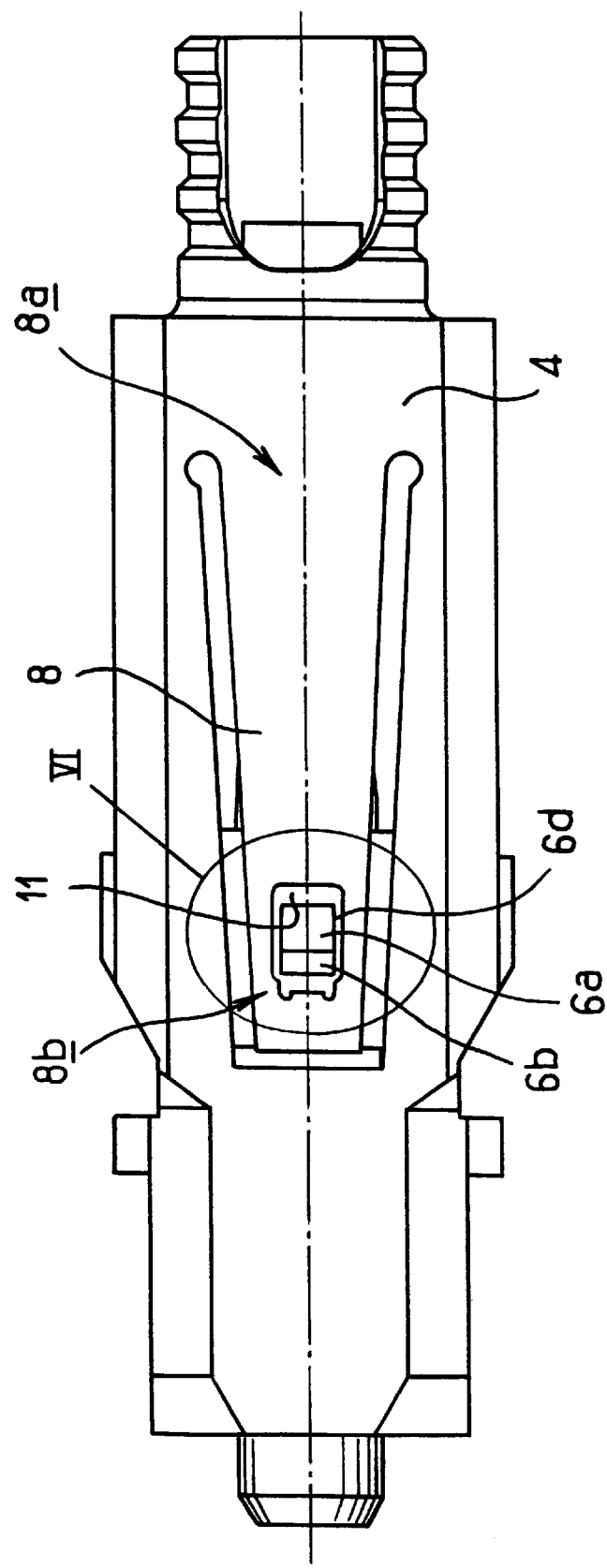
FIG. 5 is a plan view of FIG. 2, showing the connector element as connected to another connector element.

When the connector element is then connected to another connector element (not shown), the ferrule comes into contact with the facing ferrule of the other connector element, and the mutual abutment of the two ferrules causes each of them to move back, as shown in FIGS. 5 and 6A.

Thus, the lug 6 held captive in each opening 11 exits from the front portion 11b of the opening and recovers some freedom of movement in the rear portion 11a.

The two aligned ferrules in two connector elements connected together in this way therefore form a rigid assembly which can float inside the bodies of the two connector elements.

This possibility of floating is increased if, as shown in FIG. 2, there is a small amount of radial clearance 16 between the ferrule holder and each projection 10.

However, this radial clearance 16 may be omitted if the beams 8 are sufficiently resilient.

The purpose of rounded shape of the projection 10 to the rear of the abutment face 12 is to make it possible to remove the body from its mold, so that it can be made in one piece by molding a plastics material, even though no opening is provided in the rear of the body.

In other words, the snap-fastening shape of the body comprises a rear cam constituted by the roundness of the projection, which roundness causes the projection to retract when a part bearing against said rear cam is extracted from inside the body.

To impart rigidity to the body despite the presence of the resilient beams cut out from its side wall, ribs 17 are also provided inside the body between the two resilient beams.

Each rib 17 is terminated by a sloping front face 17a which serves as a rear abutment for the lugs so as to limit their axial movement in the body and the backward movement of the fiber in the cable.

As shown in FIGS. 2A and 2B, it is easy to understand that, in order to modify the angular orientation of the ferrule support relative to the body, the lugs can be released very easily by inserting a tool via the opening in the body and between its inside wall and the ferrule so as to disengage the beams 8 by bearing against the rounded shapes of the projections 10 in front of the abutment face 12.

In the embodiment shown in FIGS. 7 to 11, the connector element is of the FC type.

The above-described component parts can be seen, namely the ferrule 1, the ferrule holder 2, the spring 3, and the body 4'.

In this type of connector, there is a fourth component part which is a coupling ring 18 whose shape details are not described herein.

The connector element is provided with two resilient beams 8, each of which is provided with a projection 10 provided with a through opening 11, as described with reference to the first embodiment.

The various portions making up the snap-fastening shapes for snap-fastening to the ferrule support as well as to the body of the connector element are identical to those of the preceding embodiment, and they are given the same reference numerals.

FIGS. 12 to 14 show the front of an orientation tool 19 inserted into the connector element so as act on the snap-fastening shapes so as to cause them to retract.

The perspective view in FIG. 12 shows that the front end of the tool is bevelled and is provided with four notches 20 spaced at 90° intervals.

Each of the notches 20 is suitable for receiving a respective one of the lugs 6 on the ferrule holder.

The inside diameter of the tool is slightly larger than the outside diameter of the ferrule, but its outside diameter is slightly smaller than the inside diameter of the body of the connector element.

As a result, it is possible to insert the front of the orientation tool into the body of the connector element via the front opening therein, the front of the tool then engaging between the ferrule and the body.

FIG. 13 shows that the bevelled front end of the tool comes into contact with the projections 10 on the beams 8, on their rounded bearing surfaces which constitute front cams.

The tool constitutes a part inserted axially into the body and which, by bearing against the front cam of the snap-fastening shape, causes it to retract, as explained above.

When the tool is fully engaged in the body, as shown in FIG. 14, the resilient beams are deformed outwards, and each of the snap-fastening shapes constituted by a respective projection 10 provided with a respective opening 11 is retracted.

The ferrule assembly is then angularly disconnected from the body, but it is angularly united with the orientation tool whose four notches co-operate with respective ones of the lugs on the ferrule assembly.

By turning the orientation tool about its longitudinal axis, the ferrule assembly is rotated.

It is then necessary merely to remove the orientation tool once the ferrule assembly has effected one, two, or three quarter turns, and once two of its lugs once again face the openings 11, in order to cause the lugs to snap-fasten in the openings 11. it can be seen that, by means of this simple operation, it is possible to orient the ferrule in the body without removing any part from the connector element.

Figure 15:
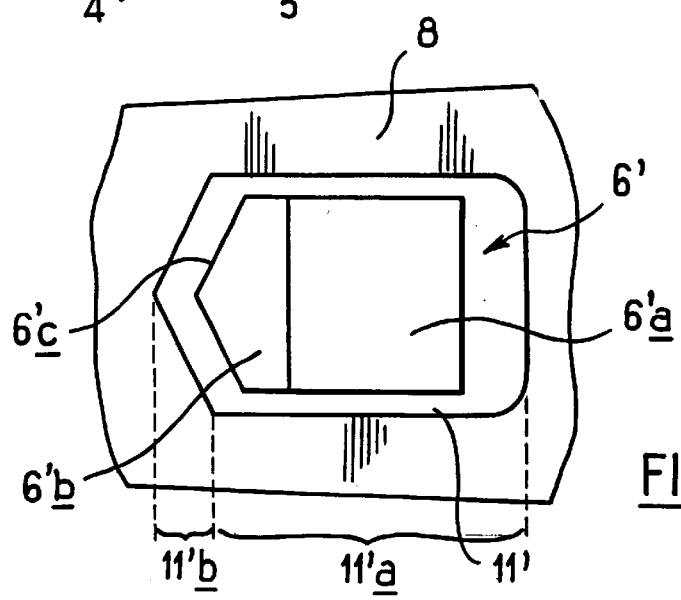
FIG. 15 is a view analogous to FIG. 6A, showing another embodiment of the invention.
Figure 10:
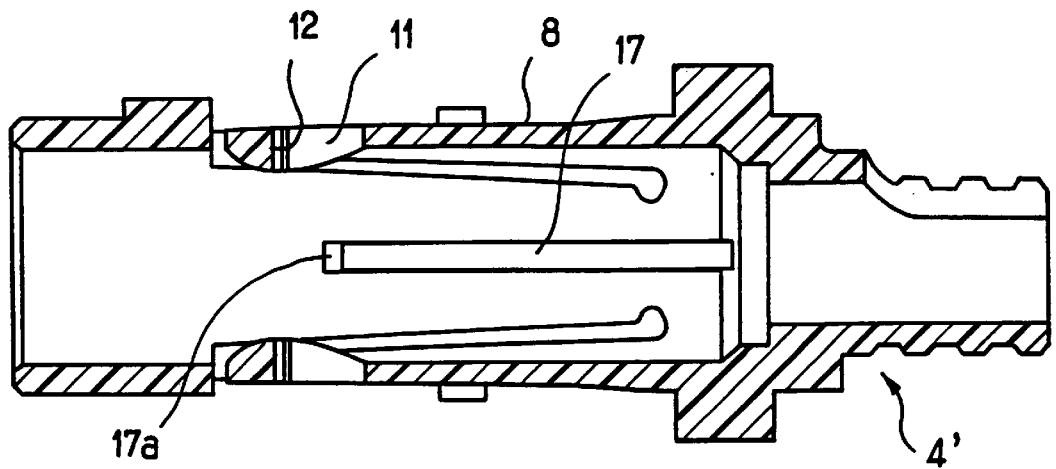
FIG. 10 is an axial section view analogous to FIG. 8A, showing the body on its own.
Figure 11:
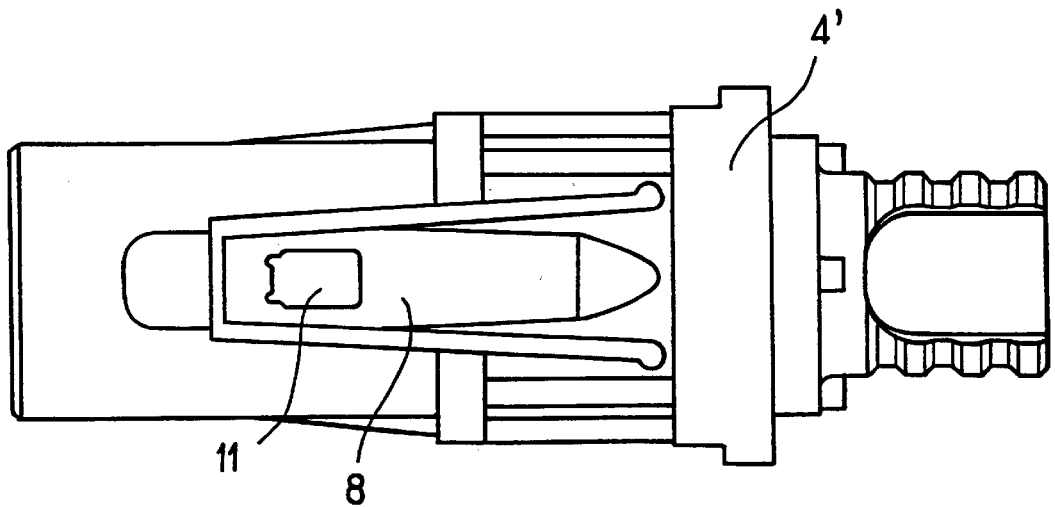
FIG. 11 is a plan view of FIG. 10.

In the embodiment shown in FIG. 15, each lug 6' comprises a cylindrical front portion 6'b and a frustoconical rear portion 6'a, as described above.

The cylindrical front portion 6'b does not have a plane end face as in the above-described embodiments, but rather it has an end face 6'c that is V-shaped.

The opening 11' provided in the projection on the beam has a rear portion 11'a that is of rectangular section, and a front portion 11'b that is of triangular section which forms a V-shape of same aperture as the V-shape of the front face 6'c of the lug, and against which said lug bears when the ferrule assembly is pushed back by the spring.

In this embodiment, as in the preceding embodiments, the snap-fastening shapes of the ferrule assembly and of the body perform the functions both of acting as an axial abutment to prevent the ferrule assembly from exiting from the body, and also of preventing the ferrule assembly from rotating relative to the body.

In another embodiment (not shown), the axial abutment may be constituted by separate means, e.g. a non-reversible snap-fastening shape, and only the function of preventing the ferrule assembly from rotating relative to the body is then performed reversibly, in accordance with the invention, by retractable snap-fastening means.

Naturally, the above-described embodiments are nonlimiting, and they can undergo any desirable modifications without going beyond the ambit of the invention.

What is claimed is:

1. An optical connector element having a coupling face for coupling to another optical connector element and comprising:

a) a ferrule serving to receive the end portion of an optical fiber;

b) a ferrule holder co-operating with the ferrule to form a continuous ferrule assembly;

c) a body receiving said ferrule assembly and open on the coupling face end so as to enable said ferrule assembly to be inserted into it;

d) resilient means tending to urge the ferrule assembly inserted into the body so that it is pushed back out of said body towards the coupling face of the connector element;

e) means for preventing the ferrule assembly from rotating relative to the body;

f) snap-fastening shapes on the ferrule assembly; and g) snap-fastening shapes on the body;

wherein the snap-fastening shapes on the body are situated on that side of the resilient means which is closer to the coupling face, and they are mounted on the body in a manner such that they can retract reversibly.

2. A connector element according to claim 1, wherein the snap-fastening shapes on the body are supported by elastically-deformable portions of the body.

3. A connector element according to claim 2, wherein the elastically-deformable portions of the body that support the snap-fastening shapes are constituted by the free ends of resilient beams cut out longitudinally in the thickness of the wall of the body.

4. A connector element according to claim 1, wherein the snap-fastening shapes on the body and on the ferrule assembly constitute an axial abutment which limits the axial displacement of the ferrule assembly in the body towards the coupling face of the connector element.

5. A connector element according to claim 1, wherein the snap-fastening shapes on the ferrule assembly are constituted by a plurality of lugs uniformly distributed about the ferrule holder.

6. A connector element according to claim 5, wherein each lug comprises a rear ramp, a front si de face and an end face.

7. A connector element according to claim 1, wherein each of the snap-fastening shapes on the body comprises a front cam which causes it to retract when a part bearing against said front cam is inserted axially into the body.

8. A connector element according to claim 1, wherein each of the snap-fastening shapes on the body comprises a rear cam which causes it to retract when a part bearing against said rear cam is extracted from inside the body.

9. A connector element according to claim 1, wherein each snap-fastening shape on the body is provided with a radial opening, and wherein the opening section comprises a rear portion that is substantially rectangular and whose width is greater than that of each lug, and a narrower front portion connected to the rear portion by two convergent walls, the front portion comprising a portion delimited by two other convergent walls separated at their ends that are closer together by a distance substantially equal to the width of each lug, and an abutment face serving to act as an abutment for the end face of the lug.

10. A connector element according to claim 6, wherein the end face of the lug is V-shaped.

11. A connector element according to claim 10, wherein each of the snap-fastening shapes on the body comprises a front cam which causes it to retract when a part bearing against said front cam is inserted axially into the body, wherein the snap-fastening shape on the body is provided with a radial opening, and wherein the opening section comprises a rear portion of rectangular section, and a front portion of triangular section that forms a V-shape of the same aperture as that of the end face of the lug.

* * * * *